United States Patent
Wakai

(10) Patent No.: US 9,881,242 B2
(45) Date of Patent: Jan. 30, 2018

(54) PRINTING APPARATUS AND POST-PROCESSING APPARATUS

(71) Applicant: CANON KABUSHIKI KAISHA, Tokyo (JP)

(72) Inventor: Kazuo Wakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/217,134

(22) Filed: Jul. 22, 2016

(65) Prior Publication Data

US 2017/0032228 A1    Feb. 2, 2017

(30) Foreign Application Priority Data

Jul. 31, 2015 (JP) ................. 2015-152698

(51) Int. Cl.
*G06K 15/00* (2006.01)
*G06K 15/02* (2006.01)
*H04N 1/00* (2006.01)

(52) U.S. Cl.
CPC ......... *G06K 15/404* (2013.01); *G06K 15/023* (2013.01); *H04N 1/0057* (2013.01); *H04N 1/0066* (2013.01); *H04N 1/00092* (2013.01); *H04N 1/00639* (2013.01); *H04N 1/00724* (2013.01); *H04N 1/00734* (2013.01); *H04N 1/00745* (2013.01); *H04N 2201/0082* (2013.01)

(58) Field of Classification Search
CPC ............... G06K 15/404; G06K 15/023; H04N 1/00092; H04N 1/00724; H04N 1/00734; H04N 1/00745; H04N 1/0057; H04N 1/00639; H04N 1/0066; H04N 2201/0082
USPC ........................................ 358/1.12
See application file for complete search history.

(56) References Cited

U.S. PATENT DOCUMENTS

| | | | |
|---|---|---|---|
| 6,209,864 B1 * | 4/2001 | Taniguchi | B42C 1/12 270/58.07 |
| 6,674,976 B2 | 1/2004 | Sato et al. | |
| 9,216,874 B2 | 12/2015 | Wakai | |
| 9,342,020 B2 * | 5/2016 | Kaneda | G03G 15/55 |
| 2003/0006548 A1 * | 1/2003 | Murata | B65H 43/00 271/256 |
| 2005/0012940 A1 * | 1/2005 | Matsuda | H04N 1/00567 358/1.1 |
| 2005/0207812 A1 * | 9/2005 | Miyazaki | H04N 1/3877 399/407 |
| 2007/0236734 A1 * | 10/2007 | Okamoto | G03G 15/5004 358/1.16 |
| 2008/0168873 A1 * | 7/2008 | Yoshimaru | B26D 7/1854 83/102 |

FOREIGN PATENT DOCUMENTS

JP     2002-274744 A     9/2002

* cited by examiner

*Primary Examiner* — Allen H Nguyen
(74) *Attorney, Agent, or Firm* — Fitzpatrick, Cella, Harper & Scinto

(57) ABSTRACT

The present printing system obtains a transparency of a sheet to be subjected to printing, and based on the obtained transparency of the sheet, restricts execution of post-processing by a discharging portion.

14 Claims, 19 Drawing Sheets

FIG. 5
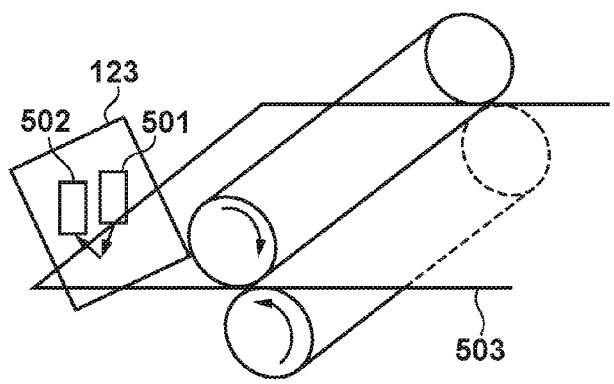
FIG. 6
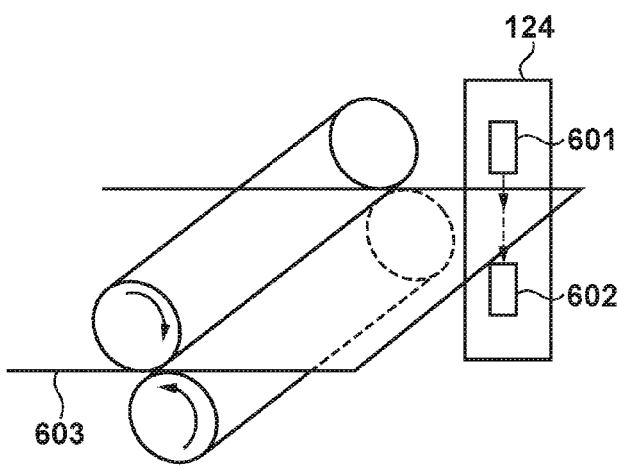
FIG. 7
| SHEET FEED TRAY NUMBER | SHEET TYPE ID | SHEET SIZE | SHEET DIRECTION | SHEET TYPE |
|---|---|---|---|---|
| 1 | 0001 | A4 | S | TRANSLUCENT |
| 2 | 0002 | A4 | S | REGULAR PAPER |
| 3 | 0005 | 190mm×250mm | L | COATED |
| 4 | 0004 | A3 | S | THICK PAPER |
| 5 | 0006 | A3 | S | THICK PAPER |

FIG. 8

| MANAGEMENT NUMBER | NAME | SHEET SIZE | SHEET TYPE | GRAMMAGE | COLOR | CREEP CORRECTION | CURL CORRECTION |
|---|---|---|---|---|---|---|---|
| 0001 | MEDIA A | A4 | TRANSLUCENT FILM | 80g | TRANSLUCENT (HIGH) | 0 | NONE |
| 0002 | MEDIA B | A4 | REGULAR PAPER | 80g | WHITE | 0.2mm | NONE |
| 0003 | MEDIA C | LTR | REGULAR PAPER | 80g | YELLOW | 0.5mm | NONE |
| 0004 | MEDIA D | A3 | THICK PAPER | 190g | WHITE | 0 | NONE |
| 0005 | MEDIA E | 190×250 | COATED PAPER | 190g | YELLOW | 0 | NONE |
| 0006 | MEDIA F | A4 | TRANSPARENT FILM | 190g | TRANSPARENT | 0 | NONE |

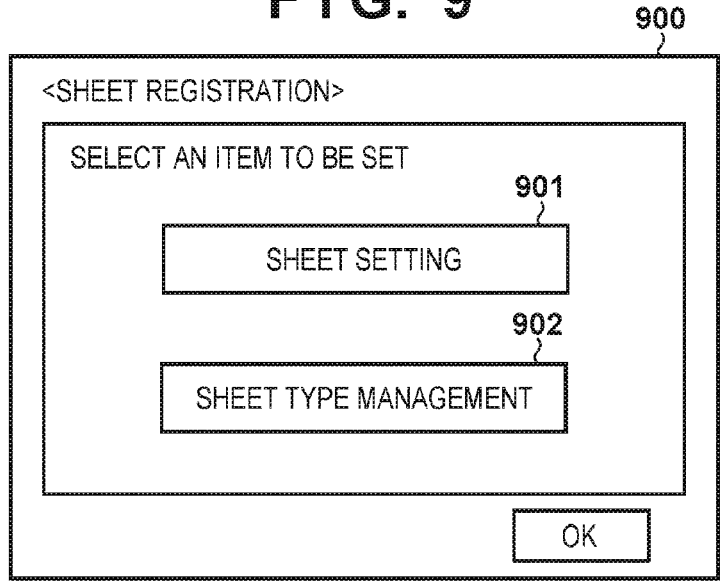

FIG. 11

DETAILS/EDIT

| NAME | MEDIA A | CHANGE |
| TYPE | TRANSLUCENT FILM | CHANGE |
| GRAMMAGE | 80g/m² | CHANGE |
| CREEP (MISALIGNMENT) CORRECTION AMOUNT | 0mm | CHANGE |
| COLOR | TRANSLUCENT (HIGH) | CHANGE — 1101 |
| | | CHANGE |

1/2

OK   CANCEL   HELP

<COLOR SETTING>

| WHITE | TRANSPARENT |
| BLUE | TRANSLUCENT (HIGH) |
| RED | TRANSLUCENT (LOW) |
| YELLOW | OTHER |

CANCEL   OK

SHEET SETTING　1400

SHEET INFORMATION　1401

| NAME | SIZE | TYPE | COLOR | GRAMMAGE |
|---|---|---|---|---|
| MEDIA A | A4 | TRANSLUCENT | TRANSLUCENT (HIGH) | 80g |
| MEDIA B | A4 | REGULAR PAPER | WHITE | 80g |
| MEDIA D | A3 | THICK PAPER | WHITE | 190g |

[DETAILS/EDIT]　[COPY]　[ERASE]

1402　[OK]　[CANCEL]　[HELP]

| TRANSPARENCY | TRANSPARENT | TRANSLUCENT (LOW) | TRANSLUCENT (HIGH) |
|---|---|---|---|
| POSITION DETECTION SENSOR | OFF | ON | OFF |
| DISCHARGE PROCESSING | DISABLED | ENABLED | DISABLED |

FIG. 18

| TRANSPARENCY | TRANSPARENT | TRANSLUCENT (LOW) | TRANSLUCENT (HIGH) |
|---|---|---|---|
| POSITION DETECTION SENSOR | OFF | ON | OFF |
| DISCHARGE PROCESSING | DISABLED | ENABLED | DISABLED |

F I G. 19A
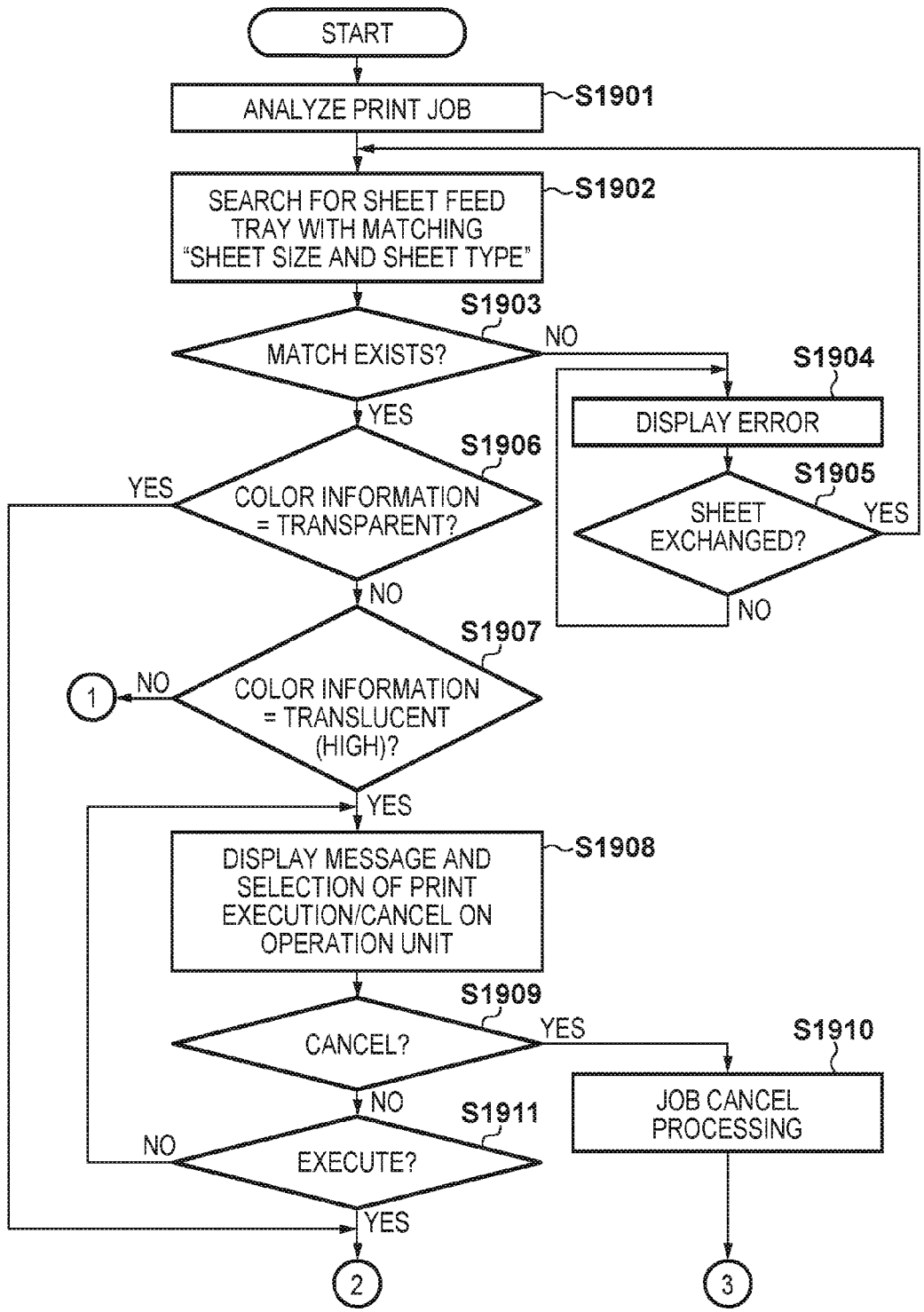

FIG. 23

| TRANSPARENCY | TRANSPARENT | TRANSLUCENT (LOW) | TRANSLUCENT (HIGH) |
|---|---|---|---|
| POSITION DETECTION SENSOR | OFF | ON | ON |
| DISCHARGE PROCESSING | DISABLED | ENABLED | ENABLED |

FIG. 24

| TRANSPARENCY | TRANSPARENT | TRANSLUCENT (LOW) | TRANSLUCENT (HIGH) |
|---|---|---|---|
| POSITION DETECTION SENSOR | OFF | ON | OFF |
| DISCHARGE PROCESSING | DISABLED | ENABLED | DISABLED |

FIG. 25

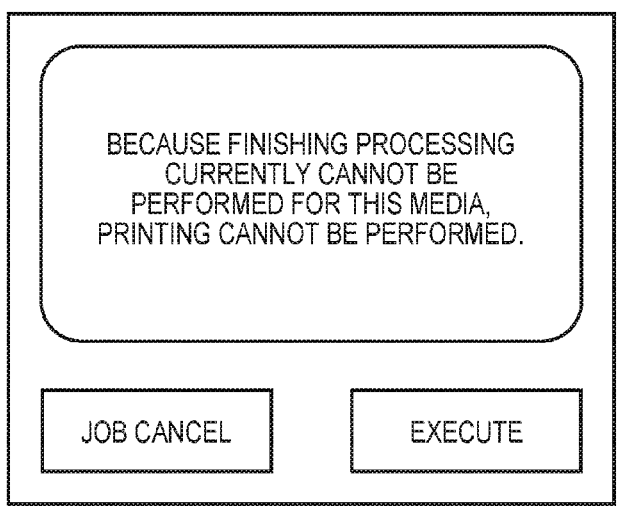

BECAUSE FINISHING PROCESSING CURRENTLY CANNOT BE PERFORMED FOR THIS MEDIA, PRINTING CANNOT BE PERFORMED.

JOB CANCEL    EXECUTE

PRINTING APPARATUS AND POST-PROCESSING APPARATUS

BACKGROUND OF THE INVENTION

Field of the Invention

The present invention relates to a printing apparatus that includes multiple sheet feed units and a discharge device with multiple discharge processing functions, and performs discharge processing control by means of sheet detection using an optical sensor in accordance with sheet information for which an instruction was given, and a post-processing apparatus.

Description of the Related Art

With a discharging apparatus, it is necessary to accurately detect the sheet position on a conveying route in a discharging apparatus in order to perform various discharge processing functions (shifting, folding, punching, saddle stitch stapling, etc.). In view of this, the discharging apparatus uses an optical sensor to detect the sheet position (includes detecting whether or not there is a sheet). Optical sensors are largely classified into a transmission type or a reflection type, the transmission type has the characteristic of having high position detection accuracy, and transmission-type optical sensors are used in discharging apparatuses. For this reason, in the case of using a type of sheet whose position cannot be detected with a transmission-type sensor, such as transparent film or an OHP sheet, for example, the sheet is only conveyed without position detection using an optical sensor being performed, and without the various discharge processing functions being carried out, and the sheet is discharged to the outside of the discharging apparatus. Japanese Patent Laid-Open No. 2002-274744 proposes controlling whether or not to execute discharge processing (shifting, folding, etc.) according to sheet type (sheet mass, OHP sheet, glossy sheet, colored paper, or sheet with holes).

However, the above-described conventional technique has the following problems. In a printing system such as POD (Print On Demand), compatibility with more types of media is desired. For example, there are also film sheets known as translucent film, which are not completely transparent but have a certain degree of transmittance as with OHP sheets, which are commonly recognized as being transparent, and these are used in printing. Because translucent film is not an OHP sheet, it is used in addition to discharge processing functions such as shifting, punching, and saddle stitching as a sheet type whose position can be detected by a transmission-type sensor.

However, among various commercially-available translucent films, there are sheets that are cloudy and are thought to have low transparency in terms of appearance, but are high in transparency in terms of optical properties and have properties close to those of OHP sheets. Since sheet position detection using a transmission-type sensor of a discharging apparatus cannot be performed when a translucent film having such properties is used and printing is executed with a sheet type of translucent film, it is always judged as an error in the discharging apparatus, and a state occurs in which discharge can never be performed.

SUMMARY OF THE INVENTION

The present invention enables realization of a mechanism that restricts a discharge processing function of a discharging apparatus in accordance with a sheet detection performance of the discharging apparatus that changes according to the sheet type.

One aspect of the present invention provides a printing apparatus, comprising: a print unit configured to print an image on a sheet; a conveying roller for conveying a sheet along a conveyance path; an optical sensor provided on the conveyance path, the optical sensor detecting an end of a sheet being conveyed by the conveying roller; a post-processing unit configured to perform post-processing on a sheet, on which an image is printed by the print, conveyed by the conveying roller, based on detection information from the optical sensor; an input unit configured to input sheet type information about a type of a sheet on which an image is printed by the print unit; and a controller configured to control the post-processing unit such that (a) if the sheet type information indicates that the sheet is a predetermined type of translucent sheet, the post-processing is performed on the sheet on which the image is printed, and (b) if the sheet type information indicates that the sheet is not the predetermined type of translucent sheet, the post-processing is not performed on the sheet on which the image is printed.

Another aspect of the present invention provides a post-processing apparatus connected to a printing apparatus having a print unit configured to print an image on a sheet, an input unit configured to input sheet type information about a type of a sheet on which an image is printed by the print unit, and a transmitter configured to transmit the sheet type information input by the input unit to the post-processing apparatus, the post-processing apparatus comprising: a conveying roller for conveying a sheet along a conveyance path; an optical sensor provided on the conveyance path, the optical sensor detecting an end of a sheet being conveyed by the conveying roller; a post-processing unit configured to perform post-processing on a sheet, on which an image is printed by the print, conveyed by the conveying roller, based on detection information from the optical sensor; a receiver for receiving the sheet type information transmitted from the printing apparatus; and a controller configured to control the post-processing unit such that (a) if the sheet type information indicates that the sheet is a predetermined type of translucent sheet, the post-processing is performed on the sheet on which the image is printed, and (b) if the sheet type information indicates that the sheet is not the predetermined type of translucent sheet, the post-processing is not performed on the sheet on which the image is printed.

Still another aspect of the present invention provides a printing apparatus comprising: a print unit configured to print an image on a sheet; a conveying roller for conveying a sheet along a conveyance path; an optical sensor provided on the conveyance path, the optical sensor detecting an end of a sheet being conveyed by the conveying roller; a post-processing unit configured to perform predetermined post-processing on a sheet, on which an image is printed by the print, conveyed by the conveying roller, based on detection information from the optical sensor; an operation unit configured to receive input of sheet type information about transparency of a sheet on which an image is printed by the print unit and to receive a designation of the post-processing from a user; and a controller configured to control the post-processing unit to perform the post-processing on the sheet on which the image is printed if the sheet type information received by the operation unit indicates that the sheet is a predetermined type of translucent paper, wherein the control unit is configured to control a display unit to display a message indicating that the post-processing cannot be executed if the sheet type information received by the operation unit indicates that the sheet is not the predetermined type of translucent paper.

Further features of the present invention will be apparent from the following description of exemplary embodiments with reference to the attached drawings.

BRIEF DESCRIPTION OF THE DRAWINGS

FIG. 5 is a structural diagram of a reflection-type sensor 123.

FIG. 6 is a structural diagram of a transmission-type sensor 124.

FIG. 7 is a diagram showing a management table holding sheet information set for sheet feeding trays.

FIG. 8 is a diagram showing a sheet type management table holding sheet type information.

FIG. 9 is a diagram of a UI displayed on an operation unit 104 at a time of registering a sheet.

FIG. 10 is a diagram of a UI of a management screen for a sheet type database displayed on the operation unit 104.

FIG. 11 is a diagram of a UI of a detail editing screen for a sheet type database displayed on the operation unit 104.

FIG. 12 is a diagram of a UI of a color information setting screen for a sheet type database displayed on the operation unit 104.

FIG. 14 is a diagram of a UI of a setting screen for a sheet, which is displayed on the operation unit 104.

FIG. 15 is a diagram showing a management table holding position detection sensor and discharge processing information.

FIG. 18 is a diagram showing a management table holding position detection sensor and discharge processing operation information.

FIGS. 19A and 19B are flowcharts of control performed by the image forming apparatus 301.

FIG. 23 is a diagram showing an example of a management table holding position detection sensor and discharge processing operation information before a setting change.

FIG. 24 is a diagram showing an example of a management table holding position detection sensor and discharge processing operation information after a setting change.

FIG. 25 is a diagram of a UI of a print job processing selection screen, which is displayed on the operation unit 104.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Configuration of Printing System

Figure 1:
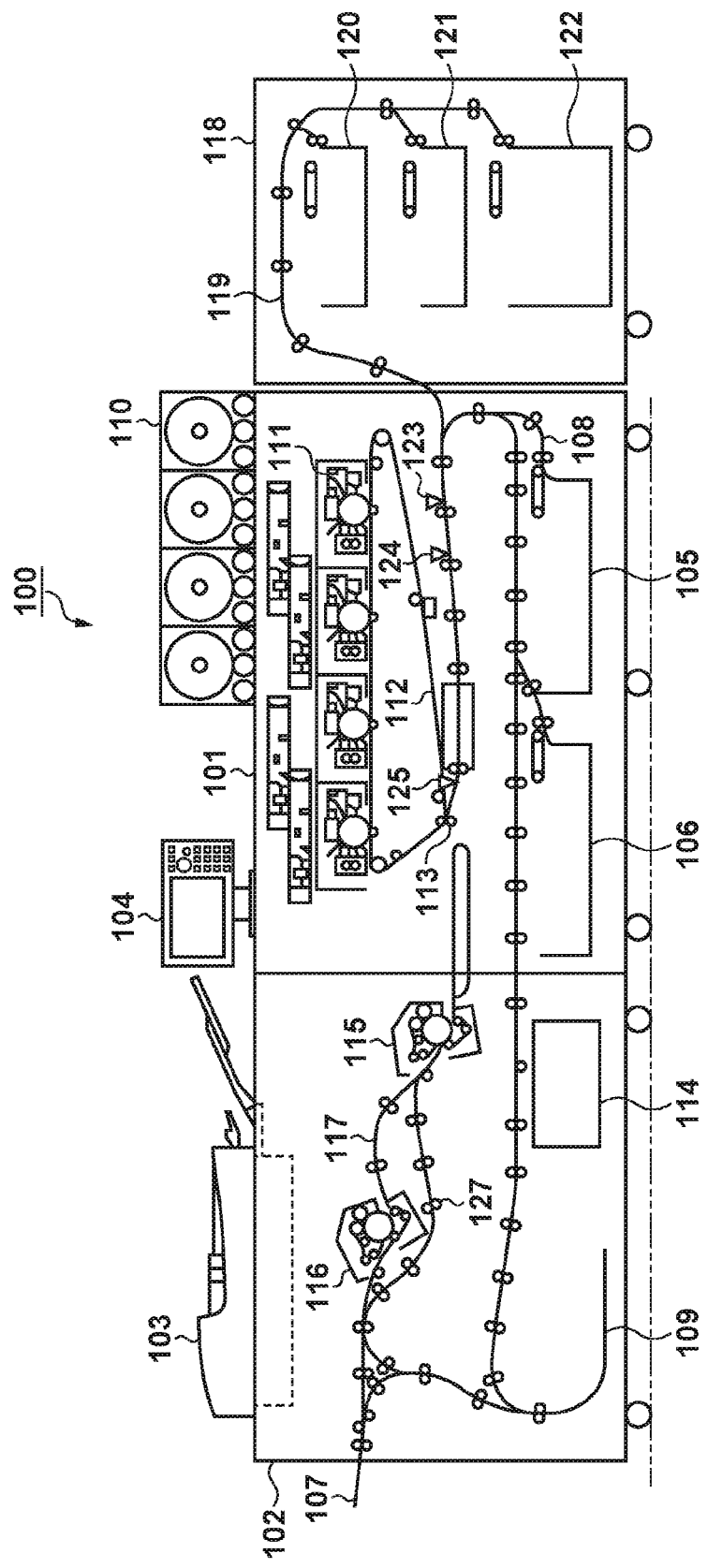
FIG. 1 is a cross-sectional diagram showing an example of a configuration of a printing system.

First, an example of a configuration of a printing system according to the present invention will be described with reference to FIG. 1. A printing system 100 includes a printing apparatus 101, a fixing apparatus 102, a scanner apparatus 103, an operation unit 104, a sheet discharge portion 107, a toner replenishing portion 110, and an external sheet feeding apparatus 118. Also, the printing apparatus 101 is provided with sheet feeding apparatuses 105 and 106, a conveying portion 108, a primary transfer portion 111, a transfer belt 112, and a secondary transfer portion 113. The fixing apparatus 102 is provided with a switchback unit 109, a waste toner storing portion 114, fixing units 115 and 116, and conveying portions 117 and 127. The external sheet feeding apparatus 118 is provided with a conveying portion 119 and sheet feeding apparatuses 120, 121, and 122.

The scanner apparatus 103 scans an original and generates electronic data of an image. The operation unit 104 receives various types of instructions given by an operator to the printing apparatus 101. Also, the operation unit 104 is provided with a hard key and a display unit of a touch panel type or the like. The sheet feeding apparatuses 105, 106, 120, 121, and 122 accumulate sheets (recording materials) for printing using the printing apparatus 101. The sheet discharge unit 107 discharges sheets on which printing has been performed to the outside of the printing apparatus 101.

The conveying portions are provided with conveying rollers for conveying sheets at a certain interval. The switchback unit 109 reverses the output surface of the sheet when discharging the sheet to the sheet discharge unit 107. The toner replenishing portion 110 replenishes toner, which is a developing material, in the printing apparatus 101. The primary transfer portion 111 transfers a toner image formed in accordance with image data to the transfer belt 112. The secondary transfer portion 113 transfers a toner image transferred to the transfer belt 112 to a sheet. The waste toner storing unit 114 stores excessive toner generated in the process of transfer processing. The fixing unit 115 fixes the toner to the sheet by applying heat and pressure to the sheet to which the image was transferred at the secondary transfer portion 113. The fixing unit 116 reinforces the fixing of the image by further applying heat and pressure to the sheet to which the image was fixed by the fixing unit 115. The conveying portions 108, 117, 119, and 127 are conveying paths for conveying a sheet.

Multiple optical sensors that detect the sheet conveying state are installed in the conveying portions of the printing apparatus 101. The reflection-type sensor 123, which is one of the optical sensors and performs sheet detection and media identification, is a sensor that detects sheets of a transparent type, such as OHP and transparent film, and identifies media. Here, a structure of the reflection-type sensor 123 and a mechanism for sheet detection and media identification will be described with reference to FIG. 5. The reflection-type sensor 123, which is one of the optical sensors, has a light emitting element 501 and a light receiving element 502. The sheet 503 is irradiated with light emitted from the light emitting element 501 and the reflected light is received by the light receiving element 502. The printing apparatus 101 performs sheet detection and media identification using the value of the reflected light received by the light receiving element 502. Also, the printing apparatus 101 can obtain the transparency of the sheet using the received light amount of the reflected light. This makes use of the fact that the reflected light changes according to the transparency of the sheet.

Also, the conveying portions of the printing apparatus 101 are provided with sheet-detecting transmission-type sensors 124 and 125 that perform sheet position detection as one type of the above-described optical sensors. Here, structures of the transmission-type sensors 124 and 125 and a mechanism for detecting the sheet position will be described with reference to FIG. 6.

The transmission-type sensors 124 and 125 each include a light emitting element 601 and a light receiving element 602. The light emitted from the light emitting element 601 is blocked when a sheet 603 passes through. Accordingly, the transmitting light received by the light receiving element 602 changes due to the transmittance of the sheet 603. The printing apparatus 101 detects the position of the sheet using the amount by which the transmitted light changes.

The conveying portion 117 is a conveying path for conveying a sheet from the fixing unit 115 to the fixing unit 116. The conveying portion 127 is a conveying path for conveying a sheet from the fixing unit 115 to the sheet discharging unit 107 or the switchback unit 109 without passing through the fixing unit 116. The conveying portions 108 and 119 are conveying paths for supplying a sheet to the printing apparatus 101.

Configuration of Discharging Apparatus

Figure 2:
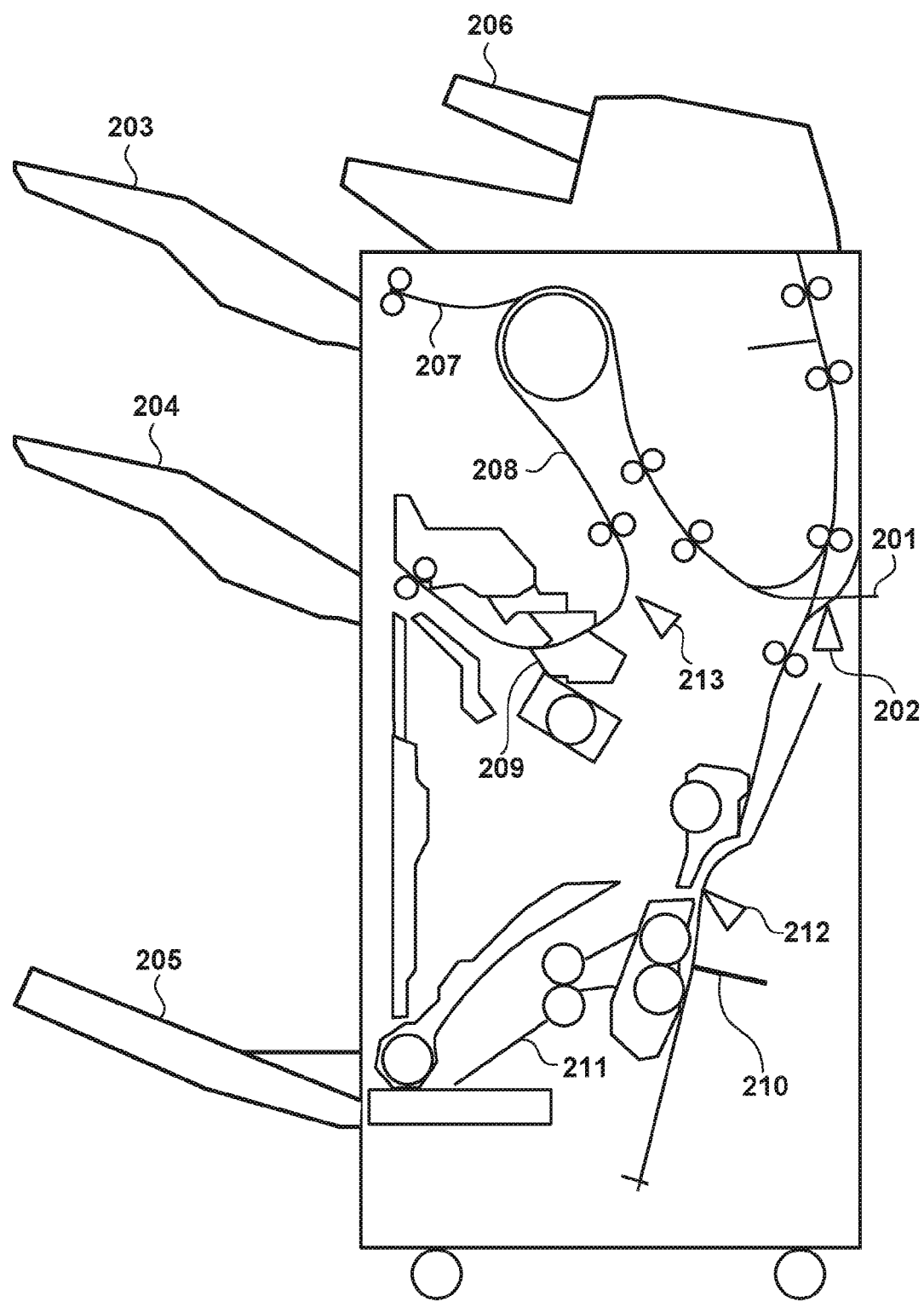
FIG. 2 is a cross-sectional diagram showing an example of a configuration of a discharging apparatus 200.

Next, a configuration of the discharging apparatus 200 that is connected through the sheet discharging portion 107 of the fixing apparatus 102 will be described with reference to FIG. 2. Note that here, the discharging apparatus 200 will be described as being separate from the printing system, but there is no limitation to this, and a configuration may be used in which the discharging apparatus 200 is included in the printing system. Also, the discharging apparatus 200 is a post-processing apparatus that performs post-processing on a sheet on which printing has been performed by the printing apparatus 101. Here, post-processing refers to stapling processing, punching processing, bookbinding processing, alignment processing for aligning multiple sheets on which printing was performed, and the like. The discharging apparatus 200 according to the present embodiment is connected directly to the fixing apparatus 102. Accordingly, a sheet for which printing is complete is conveyed from the sheet discharging portion 107 of the fixing apparatus 102 to a sheet input portion 201 of the discharging apparatus 200.

The sheet conveying path in the discharging apparatus 200 is provided with conveying rollers for conveying sheets at a certain interval. Also, multiple optical sensors 202, 212, and 213 that detect the state of conveying the sheet and the sheet position are installed. The transmission-type sensor 202, which is one of the above-described optical sensors and performs sheet position detection, is provided at the sheet input portion 201. The structure of the transmission-type sensor 202 and the mechanism for detecting the sheet position are similar to those of the transmission-type sensor 124.

With the discharging apparatus 200, post-processing is performed on the sheets for which printing is complete according to a function designated by the user. Specifically, functions such as stapling (binding at one location or two locations), punching (two holes or three holes), and saddle stitch bookbinding can be executed. The discharging apparatus 200 includes two discharge trays 203 and 204, and sheets are output to the discharge tray 203 via the sheet conveying path 207. Processing such as stapling cannot be performed on the sheet conveying path 207. In the case of performing processing such as stapling, the discharge processing of the function designated by the user is executed by the processing unit 209 via the sheet conveying path 208, and the sheets are output to the discharge tray 204.

The discharge trays 203 and 204 can be raised and lowered, and can also operate such that the discharge tray 203 is lowered and sheets subjected to discharge processing by the processing unit 209 are accumulated at the discharge port below. If an inserted sheet is designated by user designation, it is also possible to cause operation such that the inserted sheet set in an inserter 206 at a predetermined page is inserted via the sheet conveying route. If saddle stitch bookbinding is designated, the saddle stitch processing portion 210 performs stapling at the center of the sheet, and thereafter the sheet is folded in two and output to a saddle stitch bookbinding tray 205 via the sheet conveying path 211.

Control Configuration of Printing Apparatus

Figure 3:
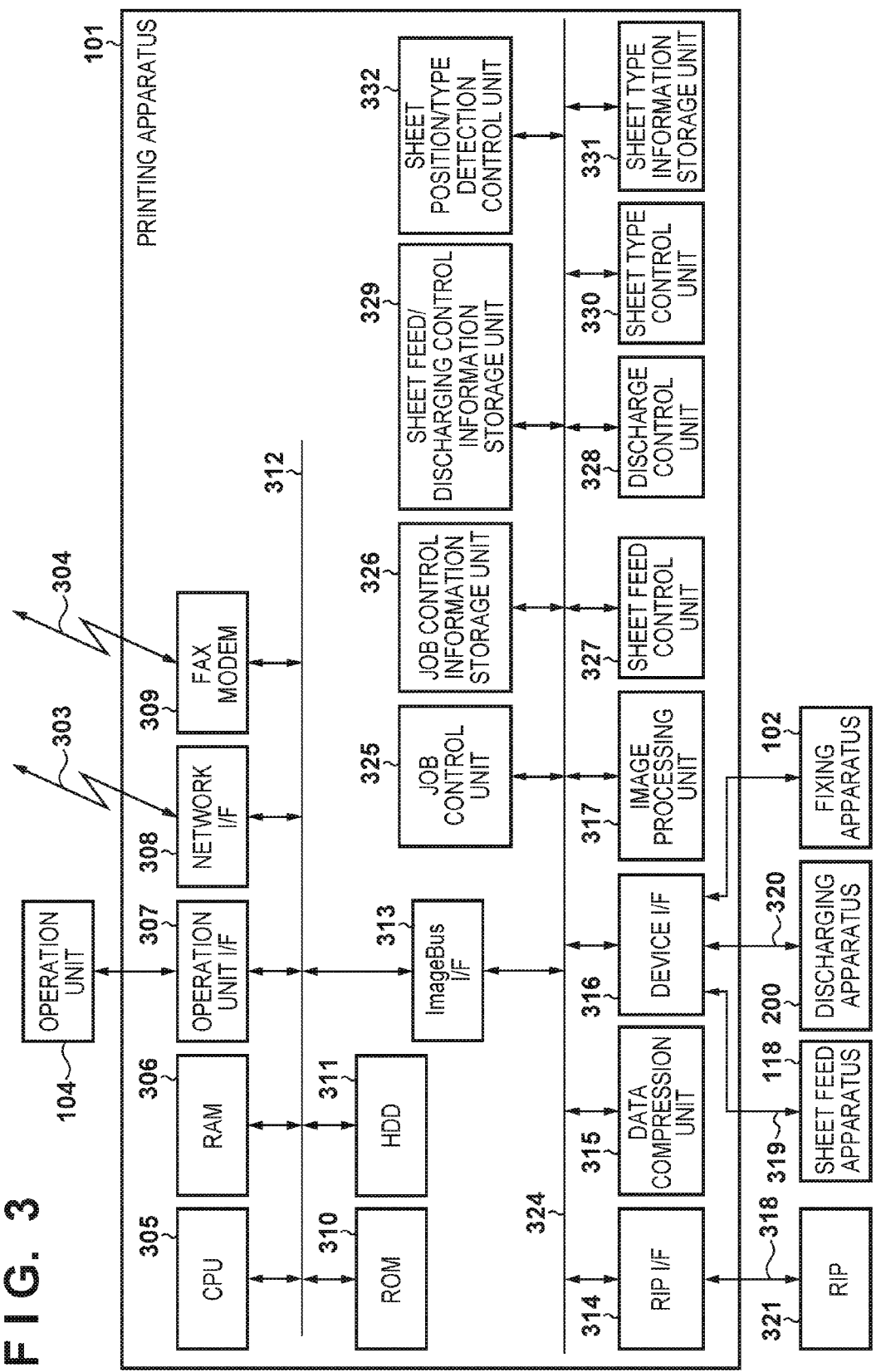
FIG. 3 is a block diagram showing an image forming apparatus 301.

Next, a control configuration of the printing apparatus 101 according to the present invention will be described with reference to FIG. 3. As the control configuration, the printing apparatus 101 includes a CPU 305, a RAM 306, an operation unit I/F 307, a network I/F 308, a fax modem 309, a ROM 310, and an HDD 311. The printing apparatus 101 also includes a RIP I/F 314, a data compression unit 315, a device I/F 316, and an image processing unit 317, which are connected via an image bus I/F 313 and will be described later. Reference numeral 312 indicates a CPU bus, and reference numeral 324 indicates an image bus.

A network cable 303 for performing connection with an external device using a network is connected to the network I/F 308. A line cable 304 for performing fax connection with an external device using a telephone line is connected to the fax modem 309.

The CPU 305 runs a program for performing overall control of the printing system 100. The RAM 306 is managed by a program that runs on the CPU 305. The RAM 306 is used for the purpose of a reception buffer for temporarily accumulating data received from an external device or an image data buffer or the like for temporarily accumulating image data rasterized by a RIP 321. The ROM 310 stores programs to be run on the CPU 305, data, and the like. The HDD 311 is a non-volatile storage apparatus capable of long-term storage of various kinds of data.

An operation unit I/F 307 is an interface for connecting the operation unit 104 and the printing apparatus 101. The image bus I/F 313 is an interface for connecting the CPU bus 312 and the image bus 324. The RIP 321 is connected to the RIP I/F 314 via the data bus 318. The RIP 321 is a rasterize board (RIP) having a function of converting image description data input from an external device into bitmap image data. The RIP I/F 314 is an interface for connecting the RIP 321 and the image bus 324 using the data bus 318. The data compression unit 315 compresses data. The external sheet feeding apparatus 118 is connected to the device I/F 316 via the data bus 319, and the discharging apparatus 200 is connected to the device I/F 316 via the data bus 320. Also, the fixing apparatus 102 is connected to the device I/F 316 via a data bus 320.

The CPU 305 issues a command to perform printing to the fixing apparatus 102, the external sheet feeding apparatus 118, and the discharging apparatus 200 via the data buses 319, 320, and 321 in accordance with a signal by which an instruction is given from the operation unit 104 or an external device via the network cable 303. Also, a command to perform printing is issued also to a load or the like included in the printing apparatus 101. For example, a command for instructing sheet feeding processing is issued to a control unit included in the external sheet feeding apparatus 118. Also, a command for instructing discharge processing, namely shifting processing, folding processing, and saddle stitch stapling, after a command for instructing preparation of sheet conveying to the control unit included in the discharging apparatus 200 is issued in association with the sheet on which printing is to be performed.

The image processing unit 317 carries out various types of image processing on the bitmap image data generated by the RIP 321. The image processing unit 317 includes a function of digitally processing bitmap image data, such as a function of compositing bitmap image data of two pages into bitmap image data of one page. The job control unit 325 analyzes the data received from the external device as a print job, obtains a sheet feed designation and control information such as discharge processing information (shifting, folding, saddle stitch, etc.), and controls the data as a job. The job control information storage unit 326 is a region that stores the obtained control information described above. The sheet feed control unit 327 manages control relating to sheet feeding together with the CPU 305 and the job control unit 325. Together with the CPU 305 and the job control unit 325, the discharge control unit 328 manages sheet-by-sheet control relating to discharging, including discharge processing functions such as shifting, folding, and binding using the discharging apparatus 200. A sheet feed/discharging control information storage unit 329 is a region that stores information related to sheet feeding/discharge control.

A sheet type control unit 330 manages sheet property information for each sheet together with the CPU 305 and the discharge control unit 328. A sheet type information storage unit 331 is a region that stores a later-described sheet type management table (FIG. 8) for sheet property information management. A sheet position/type detection control unit 332 determines the positions and media of conveyed sheets according to control performed by multiple optical sensors installed in the conveying portions of the printing apparatus 101 and according to sensor information.

Control Configuration of Discharging Apparatus 200

Figure 4:
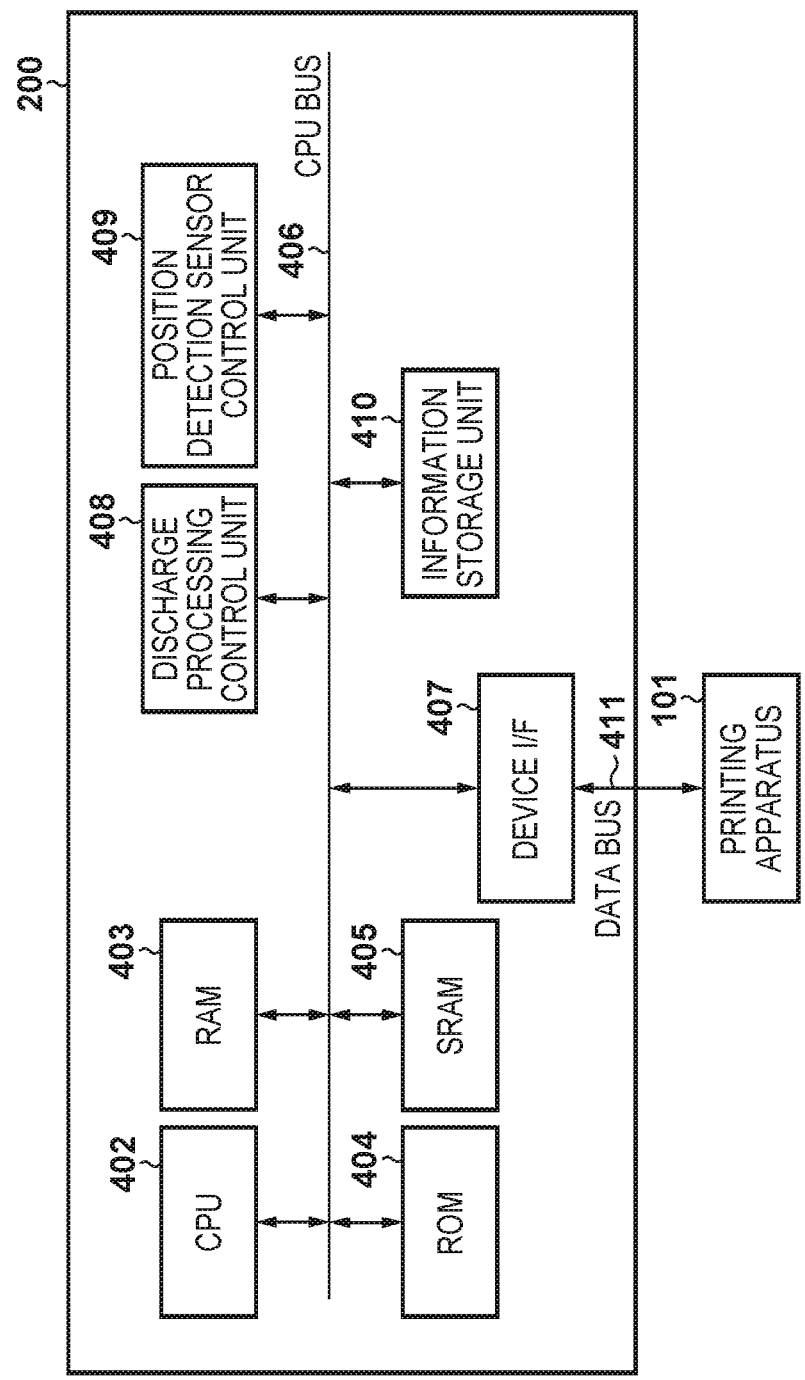
FIG. 4 is a block diagram showing a controller 401 of the discharging apparatus 200.

Next, a controller 401 of the discharging apparatus 200 according to the present invention will be described with reference to FIG. 4. The controller 401 includes a CPU 402, a RAM 403, a ROM 404, and an SRAM 405. Also, via the CPU bus I/F 406, the CPU 402 runs a program for performing overall control of the controller 401. The RAM 403 is managed by a program that runs on the CPU 402. The RAM 403 is used for the purpose of a reception buffer or the like for temporarily accumulating control commands received from the printing apparatus 101. The ROM 404 stores programs to be run on the CPU 402, data, and the like. The SRAM 405 is a non-volatile storage apparatus capable of long-term storage of various kinds of data.

The printing apparatus 101 is connected to the device I/F 407 via the data bus 411 and the fixing apparatus 102, and is used for commands for instructing discharging processing, namely shifting processing, folding processing, and saddle stitch stapling, for responding to commands, and the like. The discharge processing control unit 408 controls discharge processing in accordance with a discharge processing command received by the CPU 402 via the device I/F 407.

By means of the CPU 402, a position detection sensor control unit 409 controls an optical sensor for position detection included in the transmission-type sensor 202 installed in the discharging apparatus 200, which is a finisher. The information storage unit 410 is a region that stores control information needed for discharge processing control and position detection sensor control. For example, the information storage unit 410 is a region storing a discharging apparatus internal position detection sensor/discharge processing operation management table, shown in FIG. 15. The position detection sensor/discharge processing operation management table is a table for managing combinations of turning off or on a position detection sensor and executing or not executing discharging processing according to transparency. As the transparency, for example, transparent, translucent (low), and translucent (high), which has a higher transparency than translucent (low), are used. Note that the content of the table shown in FIG. 15 is an example and is not intended to limit the present invention.

Sheet Type Function

Next, a sheet type function according to the present embodiment will be described with reference to FIG. 8. With the sheet type function, a database (sheet type database) is included in the sheet type information storage unit 331.

The sheet type database is a database in which more detailed setting items (e.g., grammage, surface property, color, curl correction, creep correction, etc.) are accumulated for each sheet in addition to basic sheet properties (size, sheet type). The sheet type information is managed with a sheet type management table 800 in the sheet type database according to the sheet type management numbers (sheet type IDs) and names shown in FIG. 8. The sheet type information can be registered, set, and deleted from the operation unit 104.

Screen Transition at Time of Sheet Setting

Hereinafter, screen processing at a time of setting the sheet type using the operation unit 104 will be described with reference to FIGS. 9 to 14. In order to perform printing using the printing apparatus 101, it is necessary to register and manage the information of the sheets in the sheet type management table 800 stored in the sheet type information storage unit 331, and to allocate the managed sheets to a sheet feed tray. FIG. 9 shows a screen 900 that selectably displays which of the two procedures to set to the user. The operation unit 104 switches the screen to be displayed next depending on whether the sheet setting button 901 was pressed (operated) or the sheet type management button 902 was pressed.

If the sheet type management button 902 is pressed using the sheet registration screen 900, a management screen 1000 displaying a portion of the sheet type management table 800 is displayed on the operation unit 104. The name, sheet size, sheet type, color/transparency, and grammage, which are representative sheet properties, are displayed on the sheet information unit 1001 of the management screen 1000. When a desired sheet is selected by a user and a copy button 1003 is pressed, the sheet data is copied and the user customizes the copied sheet data, whereby new sheet data can be registered. On the other hand, when the details/edit button 1002 is pressed in a state in which a desired sheet has been selected in the list of the sheet information unit 1001 by the user, the detail editing screen 1100 for the sheet is displayed on the operation unit 104 as shown in FIG. 11. Then, if the OK button is pressed after editing performed by the user is received, the operation unit 104 registers that information in the sheet type database.

FIG. 12 shows a color information setting screen 1200 displayed in the case where changing of the change button 1101 for "color" has been pressed in FIG. 11. As the color information, "white", "blue", "red", "yellow", "transparent", "translucent (high)", "translucent (low)", and "other"

can be set. "Transparent", "translucent (high)", and "translucent (low)" indicate information on the transparency.

Figure 13:
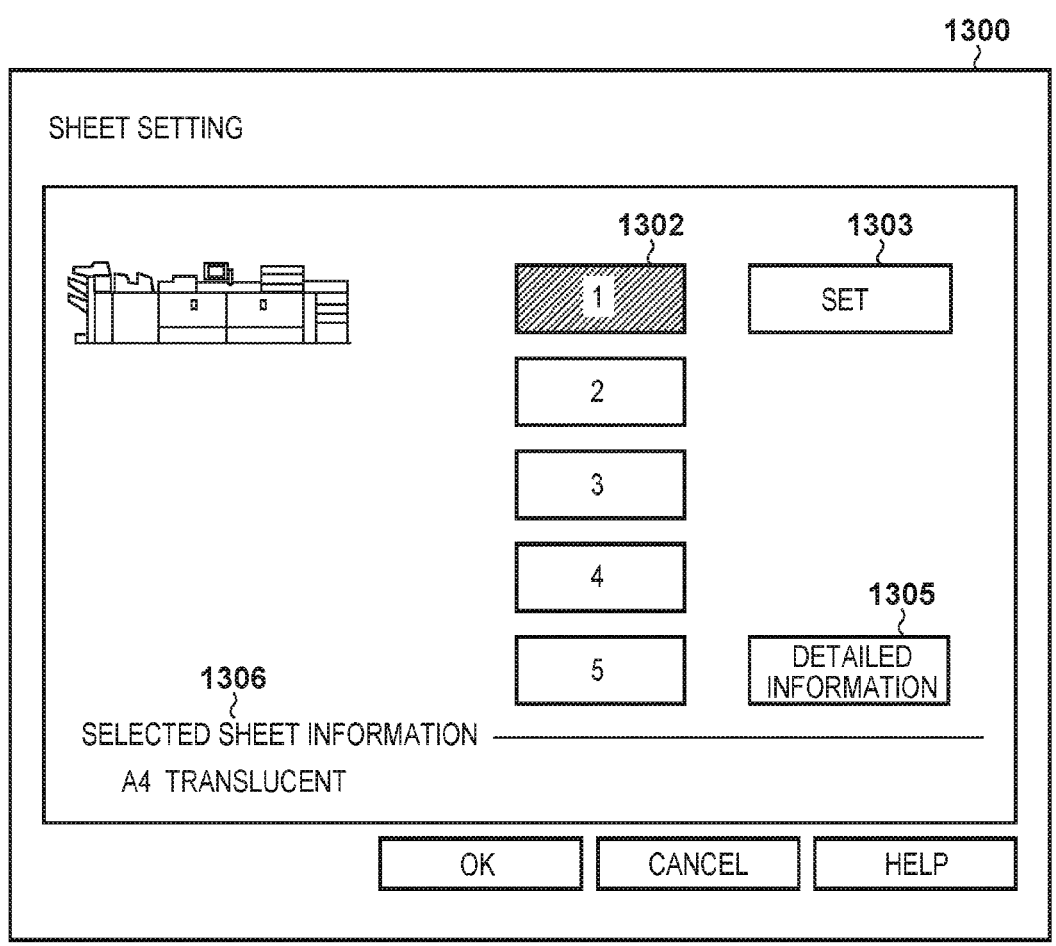
FIG. 13 is a diagram of a UI of a setting screen for a sheet feeding tray and a sheet, which is displayed on the operation unit 104.

When the setting button 901 for a sheet is pressed on the sheet registration screen 900, a sheet feed tray setting screen 1300 shown in FIG. 13 is displayed on the operation unit 104. The number of sheet feed trays differs depending on the optional configuration of the printing apparatus. The operation unit 104 switches the display according to the optional configuration, and here, buttons 1302 corresponding to five sheet feed trays (discharging apparatuses) 105, 106, 120, 121, and 122 are displayed. When the user selects a button for a desired sheet feed tray, information 1306 of the sheet set for the selected sheet feed tray is displayed in the lower portion of the screen. For example, in FIG. 13, the button for sheet feed tray 1 has been selected, and the field for the information 1306 of the sheet displays that a sheet with a sheet size "A4" and a sheet type "translucent film" has been set for the sheet feed tray 1.

In the case of changing the sheet set for the sheet feed tray, the sheet feed tray to be changed is selected, and the setting button 1303 in the upper right of the screen is pressed. When the setting button 1303 is pressed, the sheet setting screen 1400 shown in FIG. 14 is displayed on the operation unit 104. The sheet information 1401 displayed in the center of the screen is information of the sheet type database. The name, sheet size, sheet type, color (transparency), and grammage, which are sheet properties, are displayed in the sheet information 1401. Also, "**" in the name field indicates the name of the sheet currently set for the sheet feed tray.

If the sheet set for the sheet feed tray is to be changed, the user can change it by selecting the name of the sheet to be set and pressing the OK button 1402. If the current settings are fine as they are, it is sufficient to press the cancel button. Upon doing so, the operation unit 104 sets the sheet selected according to the input of the user for the sheet feed tray.

FIG. 7 shows a sheet feed tray management table 700 stored in a sheet feed/discharging control information storage portion 329. The sheet feed tray management table 700 is a table for managing information indicating what kind of sheets are stored for the sheet feed trays (sheet feeding apparatuses) 105, 106, 120, 121, and 122. Sheet property information such as the sheet sizes and sheet types, the sheet type IDs, and the sheet directions of the respective stored sheets are defined in the sheet feed tray management table 700 for the sheet feed tray numbers indicating the sheet feed trays. The sheet type IDs indicate unique identification numbers allocated for each sheet type. For the sheet sizes, it is possible to register undefined sizes such as "190 mm×250 mm" in addition to defined sizes such as A3 and A4. For the sheet direction, information on the direction of sheets (e.g., vertical direction, horizontal direction, etc.) mounted on the sheet feed trays is registered. Note that as for the setting values, here, S and L are used as an example but are not intended to be limiting, and the setting values may be set so as to match the use of the printing apparatuses. For the sheet type, the type of sheets mounted on the sheet feed trays is set.

First Embodiment

Figure 16:
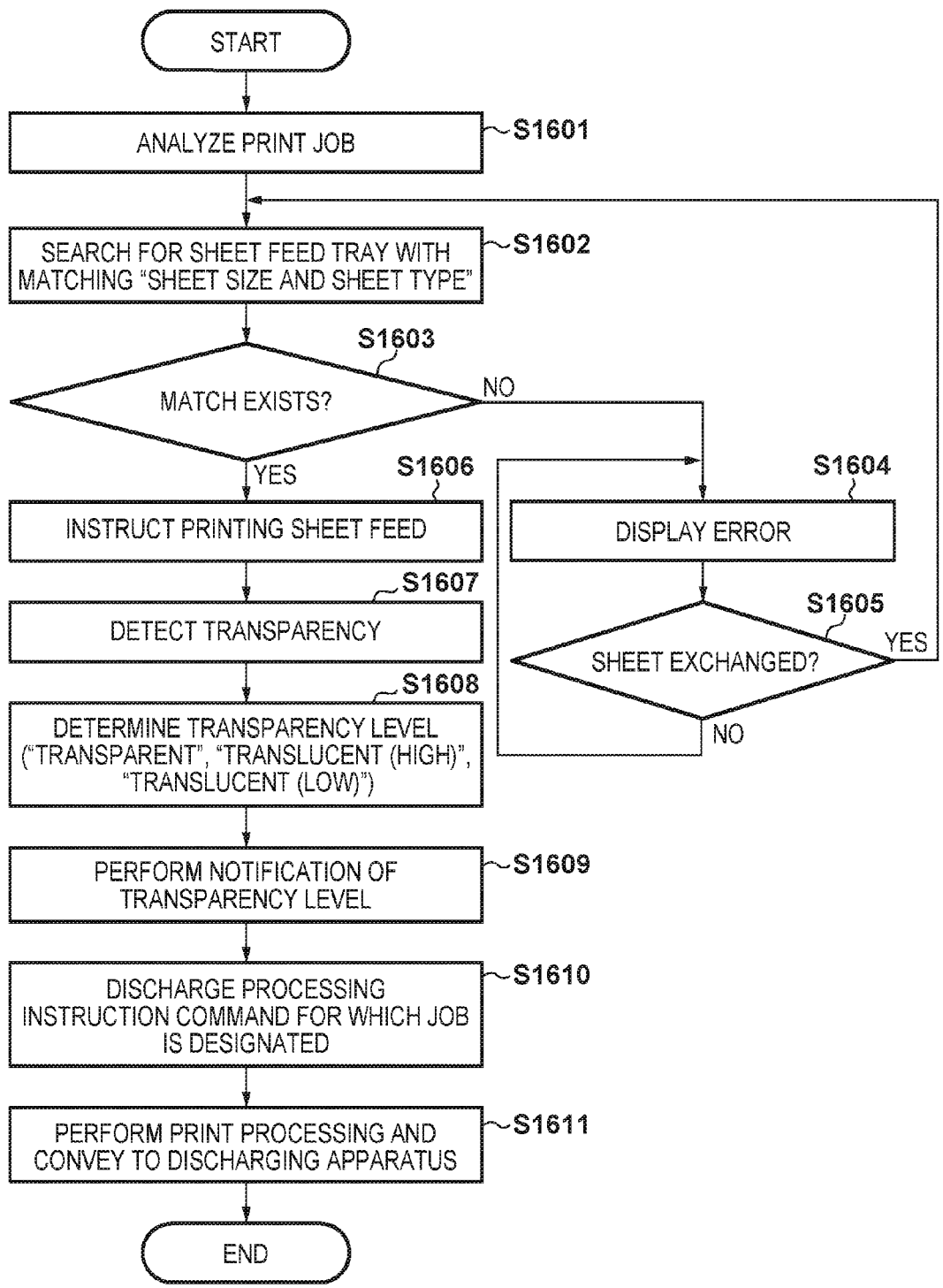
FIG. 16 is a flowchart of control performed by an image forming apparatus 301.
Figure 17:
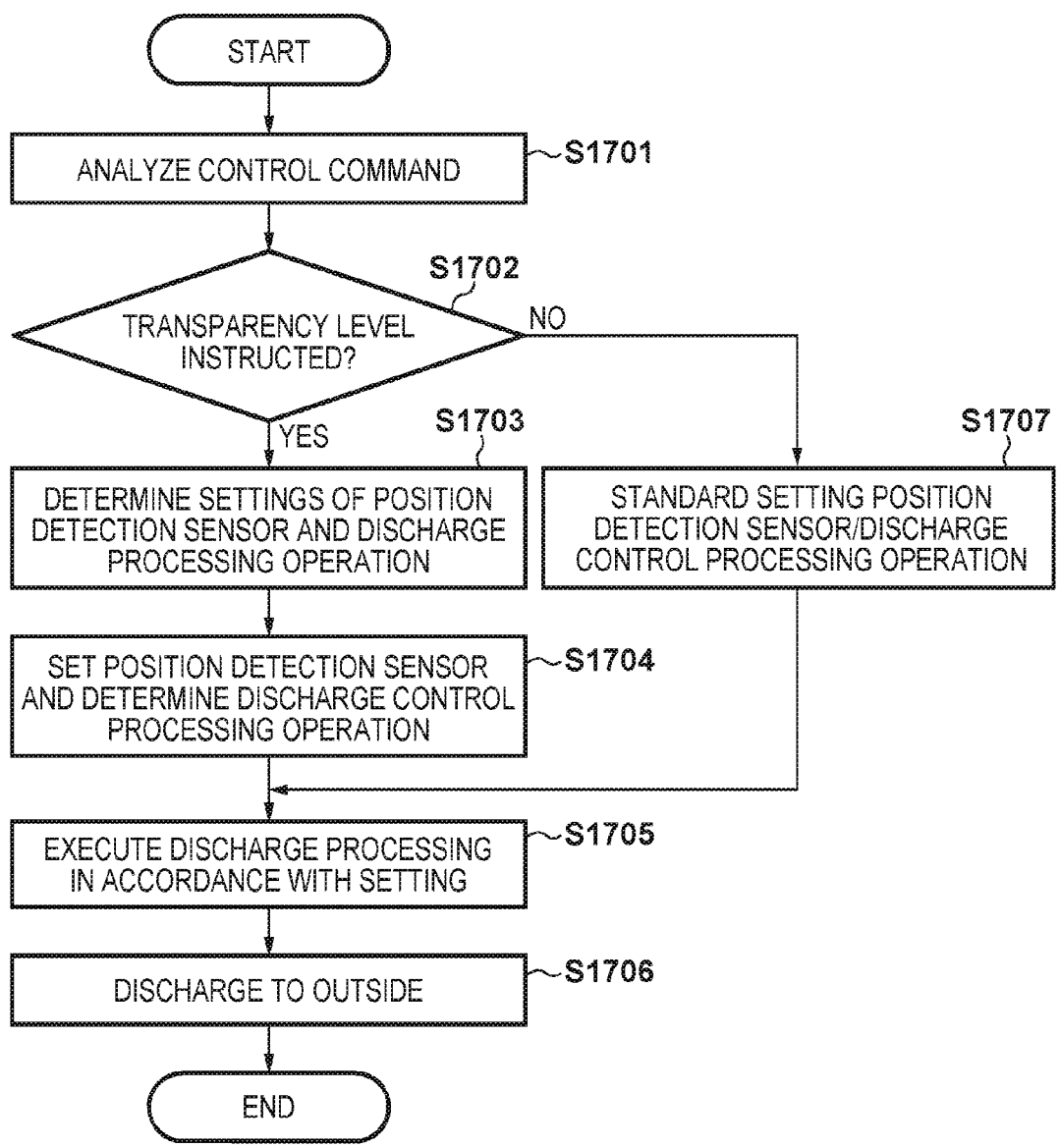
FIG. 17 is a flowchart of control performed by the controller 401.

Hereinafter, a first embodiment of the present invention will be described with reference to FIGS. 16 and 17. In the present embodiment, control is performed by notifying the discharging apparatus 200 of transparency information detected by the sensors of the printing apparatus 101 and switching the position detection sensors in the discharging apparatus off or on and switching whether or not the discharge control processing is enabled based on that information.

First, a procedure of processing performed by the printing apparatus 101 will be described with reference to FIG. 16. The processing described below is realized by the CPU 305 of the printing apparatus 101 reading out a control program stored in the ROM 310 or the HDD 311 to the RAM 306 and executing it.

In step S1601, the CPU 305 receives a print job, analyzes the received job by means of the job control unit 325, and obtains sheet information (sheet size, sheet type) to be used in the job and discharge processing designation information (e.g., a shift designation). Next, in step S1602, the CPU 305 searches for whether or not there is a sheet feed tray with a matching sheet size and sheet type among the obtained sheet information and the information managed in the sheet feed tray management table 700 of the sheet feed/discharging control information storage unit 329. In step S1603, the CPU 305 determines whether or not a matching sheet feed tray exists based on the search result of step S1602.

If there is no matching sheet feed tray, the processing moves to step S1604, and the CPU 305 displays an error (no sheet) on the operation unit 104 through the operation unit I/F 307 by means of the sheet feed control unit 327. Next, the processing moves to step S1605, and the CPU 305 determines whether or not sheet exchange has been performed by means of the sheet feed control unit 327. If sheet exchange has been performed, the processing returns to step S1602. If sheet exchange has not been performed, the processing returns to step S1604, and an error is displayed until sheet exchange is performed.

On the other hand, if there is a matching sheet feed tray in step S1603, the processing moves to step S1606. In step S1606, the CPU 305 issues a command to execute sheet feeding on the matching sheet feed tray to the external sheet feeding apparatus 118 via the device I/F 316 by means of the sheet feed control unit 327 and feeds a sheet. Next, in step S1607, the CPU 305 detects the transparency of the sheet using the reflected light amount sensed by the sheet position/type detection control unit 332 when the fed sheet passes through the position of the reflection-type sensor 123. Then, in step S1608, the CPU 305 determines which level among "transparent", "translucent (high)", and "translucent (low)", in order starting from highest transparency, the detected transparency is to be categorized into. In step S1609, the CPU 305 notifies the discharging apparatus 200 of the transparency level ("transparent", "translucent (high)", or "translucent (low)") determined via the device I/F 316 by means of the discharge control unit 328 and the sheet position/type detection control unit 332.

Next, in step S1610, the CPU 305 notifies the discharging apparatus 200 of a discharge processing instruction command in accordance with the discharge processing designation information analyzed in step S1601 via the device I/F 316 by means of the discharge control unit 328 and the job control unit 325. Next, in step S1611, the CPU 305 uses the printing apparatus 101 and the fixing apparatus 102 and uses the sheet of the sheet feed tray selected in step S1603 to perform printing in accordance with the print job and causes sheets subjected to printing to be conveyed to the discharging apparatus 200.

Next, with reference to FIG. 17, a processing procedure of the controller 401 in the discharging apparatus 200 will be described. The processing described hereinafter is realized by the CPU 402 of the discharging apparatus 200 reading out a control program stored in the ROM 404 or the like to the RAM 403 and executing it.

In step S1701, the CPU 402 analyzes a control command notified from the printing apparatus 101 via the device I/F 407 by means of the discharge processing control unit 408. Next, in step S1702, the CPU 402 determines whether or not the control command is a notification of the transparency level by means of the discharge processing control unit 408. If the control command is a notification of the transparency level, the processing moves to step S1703, and if not, the processing moves to step S1707.

In step S1703, the CPU 402 determines the position detection sensor and discharge processing operation corresponding to the transparency level notified based on the discharging apparatus internal position detection sensor/discharge processing operation management table 1500 by means of the discharge processing control unit 408 and the position detection sensor control unit 409. Next, in step S1704, the CPU 402 sets the determined operation by means of the discharge processing control unit 408 and the position detection sensor control unit 409. For example, if the transparency level is translucent (high), based on the discharging apparatus internal position detection sensor/discharge processing operation management table 1500, the CPU 402 sets the optical sensors for position detection including the transmission-type sensor 202 to OFF by means of the position detection sensor control unit 409. In other words, here, it is determined that the optical sensors for position detection cannot be used.

In step S1705, the CPU 402 does not perform discharge processing (post-processing) in accordance with the setting using the discharge processing control unit 408, but performs only conveying of the sheet to be conveyed from the sheet input unit 201 by controlling the conveying rollers by means of the discharge processing control unit 408. Next, in step S1706, the CPU 402 discharges the sheet to the outside, such as the sheet feed trays 203 and 204, by means of the discharge processing control unit 408.

On the other hand, if the control command was not a notification of the transparency level in step S1702, the processing moves to step S1707, and the CPU 402 sets the optical sensors for position detection, which have normal settings, to ON and enables a discharge processing operation, by means of the discharge processing control unit 408 and the position detection sensor control unit 409. Then, the processing moves to step S1705.

As described above, with the printing system 100 according to the present embodiment, the discharging apparatus 200 is notified of the transparency level detected by the sensors of the printing apparatus 101 and based on that information, control is performed by switching between the OFF and ON settings of the position detection sensors in the discharging apparatus and whether or not the discharge control processing is enabled. Accordingly, a sheet for which sheet position detection cannot be performed by the sensors of the discharging apparatus 200 can be discharged normally without causing an error. Thus, with the present invention, information relating to "transparency" is added to the sheet information of which the discharging apparatus 200 is notified, and the information of the sheet type and transparency is used as a basis for determining whether or not the discharging apparatus 200 is to perform position detection and whether or not the discharging apparatus 200 is to perform a discharge processing function. Accordingly, even if a sheet that appears to be cloudy and is thought to have a low transparency but cannot be subjected to position detection using an existing transmission-type sensor of the discharging apparatus due to having optical properties with a high transparency is newly introduced, it is possible to confirm that detection cannot be performed preferably with the transmission-type sensor. Accordingly, even when using such a sheet, it is possible to avoid a state in which an error always occurs in the discharging apparatus and discharging cannot be performed normally.

Note that the present invention is not limited to the above-described embodiment and can be modified in various ways. For example, the above-described embodiment described a mode of determining whether or not the discharge processing function (post-processing) is to be performed by the discharging apparatus 200 due to the discharging apparatus 200 being notified of the transparency information by the printing apparatus 101. However, the present invention is not limited to this, and it is possible to perform determination using the printing apparatus 101 and notify the discharging apparatus 200 of the control result. That is, one of the printing apparatus 101 and the discharging apparatus 200 may be provided with a restricting unit that determines whether or not the discharge processing function (post-processing) is to be executed.

Second Embodiment

Hereinafter, a second embodiment of the present invention will be described with reference to FIGS. 18 to 21. In the present embodiment, control is performed by switching between OFF and ON settings of the position detection sensors in the discharging apparatus and between whether or not the discharge control processing is enabled based on the transparency information of the sheet type information.

FIG. 18 shows a table 1800 for managing combinations of switching OFF and ON of the position detection sensors and executing and not executing discharge processing, which are instructed to the discharging apparatus 200 in correspondence with the transparency information of the sheet type information, in the printing apparatus 101. In the present embodiment, the OFF and ON settings of the position detection sensors and the enabling and disabling of discharge control processing are controlled in accordance with the setting content of the table 1800 corresponding to the transparency information of the used sheet type information.

Figure 19B:
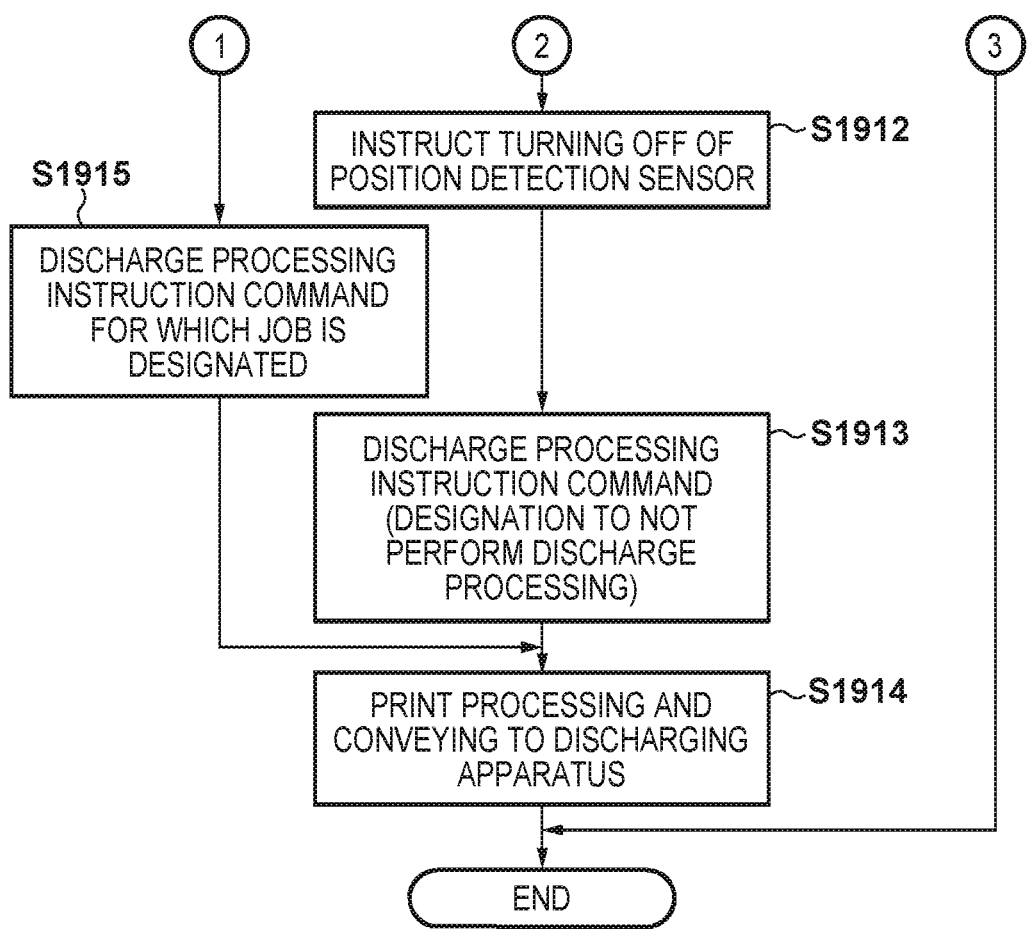

A procedure of processing performed by the printing apparatus 101 will be described with reference to FIGS. 19A and 19B. The processing described below is realized by the CPU 305 of the printing apparatus 101 reading out a control program stored in the ROM 310 or the HDD 311 to the RAM 306 and executing it.

In step S1901, the CPU 305 receives a print job, analyzes the received job using the job control unit 325, and obtains sheet information (sheet size, sheet type) to be used in the job and discharge processing designation information (e.g., a shift designation). Next, in step S1902, the CPU 305 searches for whether or not there is a sheet feed tray with a matching sheet size and sheet type among the obtained sheet information and the information managed in the sheet feed tray management table 700 of the sheet feed/discharging control information storage unit 329. In step S1903, the CPU 305 determines whether or not a matching sheet feed tray exists based on the search result of step S1902.

If there is no matching sheet feed tray, the processing moves to step S1904, and the CPU 305 displays an error (no sheet) on the operation unit 104 through the operation unit I/F 307 by means of the sheet feed control unit 327. Next, the processing moves to step S1905, and the CPU 305 determines whether or not sheet exchange has been performed by means of the sheet feed control unit 327. If sheet exchange has been performed, the processing returns to step S1902. If sheet exchange has not been performed, the processing returns to step S1904, and an error is displayed until sheet exchange is performed.

On the other hand, if there is a matching sheet feed tray in step S1903, the processing moves to step S1906. In step S1906, the CPU 305 determines whether or not the color information (transparency setting) of the sheet is transparent based on the sheet feed tray management table 700 and the sheet type management table 800 stored in the sheet feed/discharging control information storage unit 329, by means of the sheet feed control unit 327. If the color information (transparency setting) is not transparent, the processing moves to step S1907, and if not, the processing moves to step S1912. In step S1907, the CPU 305 determines whether or not the color information (transparency setting) is translucent (high) based on the sheet feed tray management table 700 and the sheet type management table 800 stored in the sheet feed/discharging control information storage unit 329.

Figure 20:
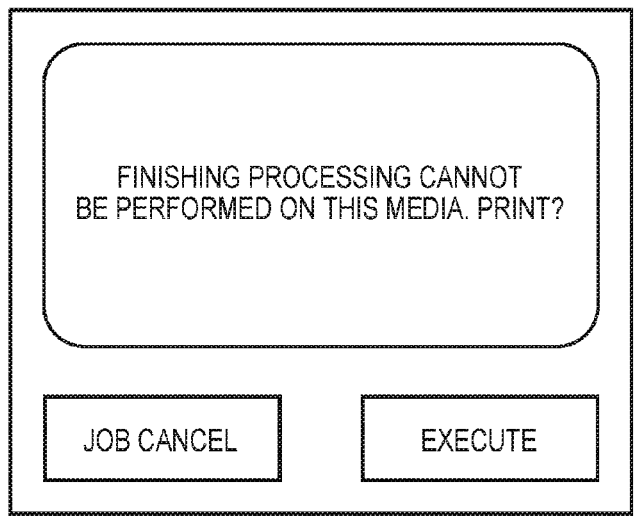
FIG. 20 is a diagram of a UI of a print job processing selection screen, which is displayed on the operation unit 104.

If the color information (transparency setting) is translucent (high), the processing moves to step S1908, and the CPU 305 displays a message and an operation button shown in FIG. 20 on the operation unit 104 through the operation unit I/F 307 by means of the discharge control unit 328 and the job control unit 325. On the screen shown in FIG. 20, notification of the fact that post-processing cannot be performed due to the type of the sheet (since it is of a transparency that cannot be detected by the sensors) is performed, and the user is allowed to select whether to execute or cancel the job.

In step S1909, the CPU 305 determines whether or not job canceling has been selected. If job cancelling has been selected, the processing moves to step S1910, and the CPU 305 cancels the print job by means of the job control unit 325. If the job is not to be canceled, the processing moves to step S1911, and the CPU 305 determines whether or not execution has been selected. If execution has been selected, the processing moves to step S1912, and if not, the processing is returned to step S1908. In step S1912, the CPU 305 performs notification of an instruction to temporarily turn off the position detection sensors in the discharging apparatus 200 in accordance with the setting values in the table 1800 via the device I/F 316, by means of the discharge control unit 328 and the job control unit 325.

Next, in step S1913, the CPU 305 performs notification of a discharge processing instruction command (a designation to not perform discharge processing) via the device I/F 316 by means of the discharge control unit 328 and the job control unit 325. Next, in step S1914, the printing apparatus 101 performs printing in accordance with the print job using the sheet of the sheet feed tray selected in step S1903, conveys the printed sheet to the discharging apparatus 200, and ends the processing.

On the other hand, if the color information (transparency setting) is not translucent (high) in step S1907, the processing moves to step S1915. Next, in step S1915, by means of the discharge control unit 328 and the job control unit 325, the CPU 305 performs notification of a discharge processing instruction command in accordance with the discharge processing designation information analyzed in step S1901 via the device I/F 316, and the processing moves to step S1914.

Figure 21:
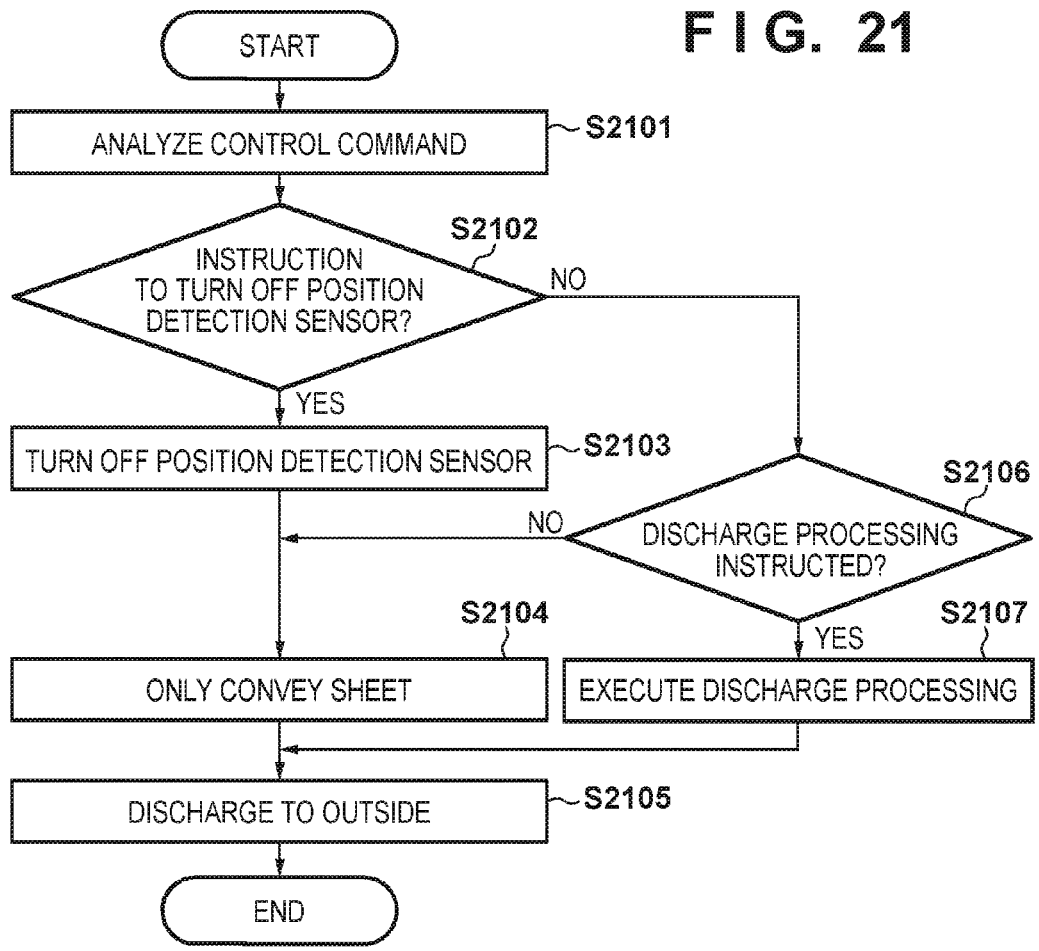
FIG. 21 is a flowchart of control performed by the controller 401.

Next, with reference to FIG. 21, a processing procedure of the controller 401 in the discharging apparatus 200 will be described. The processing described hereinafter is realized by the CPU 402 of the discharging apparatus 200 reading out a control program stored in the ROM 404 or the like to the RAM 403 and executing it.

In step S2101, the CPU 402 analyzes a control command notified from the printing apparatus 101 by the discharge processing control unit 408 via the device I/F 407. Next, in step S2102, by means of the discharge processing control unit 408 and the position detection sensor control unit 409, the CPU 402 determines whether or not an instruction to turn off the position detection sensors was received. If an instruction to turn off the sensor was received, the processing moves to step S2103, and if not, the processing moves to step S2106.

In step S2103, by means of the position detection sensor control unit 409, the CPU 402 turns off the optical sensor for position detection included in the transmission-type sensor 202. Thereafter, the processing moves to step S2104, and the CPU 402 executes a discharge processing instruction for a discharge processing instruction command (a designation to not perform discharge processing) by means of the discharge processing control unit 408. Here, the CPU 402 only conveys the sheet conveyed from the sheet input unit 201 by controlling the transfer roller by means of the discharge processing control unit 408. Next, in step S2105, the CPU 402 discharges the sheet to the outside, such as the sheet feed trays 203 and 204, by means of the discharge processing control unit 408.

On the other hand, if there is no instruction to turn off the position detection sensors in step S2102, the processing moves to step S2106, and the CPU 402 determines whether or not there is a discharge processing instruction by means of the discharge processing control unit 408. If there is a discharge processing instruction (e.g., a shift designation), the processing moves to step S2107, and if not, the processing moves to step S2104.

In step S2107, the CPU 402 detects the sheet position during conveying by means of the position detection sensor control unit 409, and uses that information to execute predetermined discharge processing (shifting) by means of the discharge processing control unit 408. Then, in step S2105, the CPU 402 discharges the sheets resulting from discharge processing to the sheet feed tray corresponding to the discharge processing by means of the discharge processing control unit 408.

As described above, a printing apparatus including transparency information as sheet type information performs control by switching between OFF and ON settings of position detection sensors in the discharging apparatus, and between enabling and disabling discharge control processing based on the transparency information. Thus, even in the case of a job using a sheet whose optical properties (transparency is high) differ even though it is the same sheet type, and that cannot be subjected to sheet position detection performed by the sensor of the discharging apparatus, checking can be performed easily. Accordingly, it is possible to allow the user to select whether to cancel the job or discharge the sheet without executing the designated discharge control processing, and it is possible to avoid a case in which an error occurs and discharging can no longer be performed.

Third Embodiment

Hereinafter, a third embodiment of the present invention will be described with reference to FIGS. 22 to 25. In the present embodiment, when an error occurs in a position detection sensor in the discharging apparatus 200 during execution of the discharge processing, the setting of the position detection sensor/discharge processing operation management table is changed. Thereafter, control is performed by switching between the off and on settings of the position detection sensors in the discharging apparatus 200 and between enabling and disabling the discharge control processing in accordance with the updated settings.

Figure 22A:
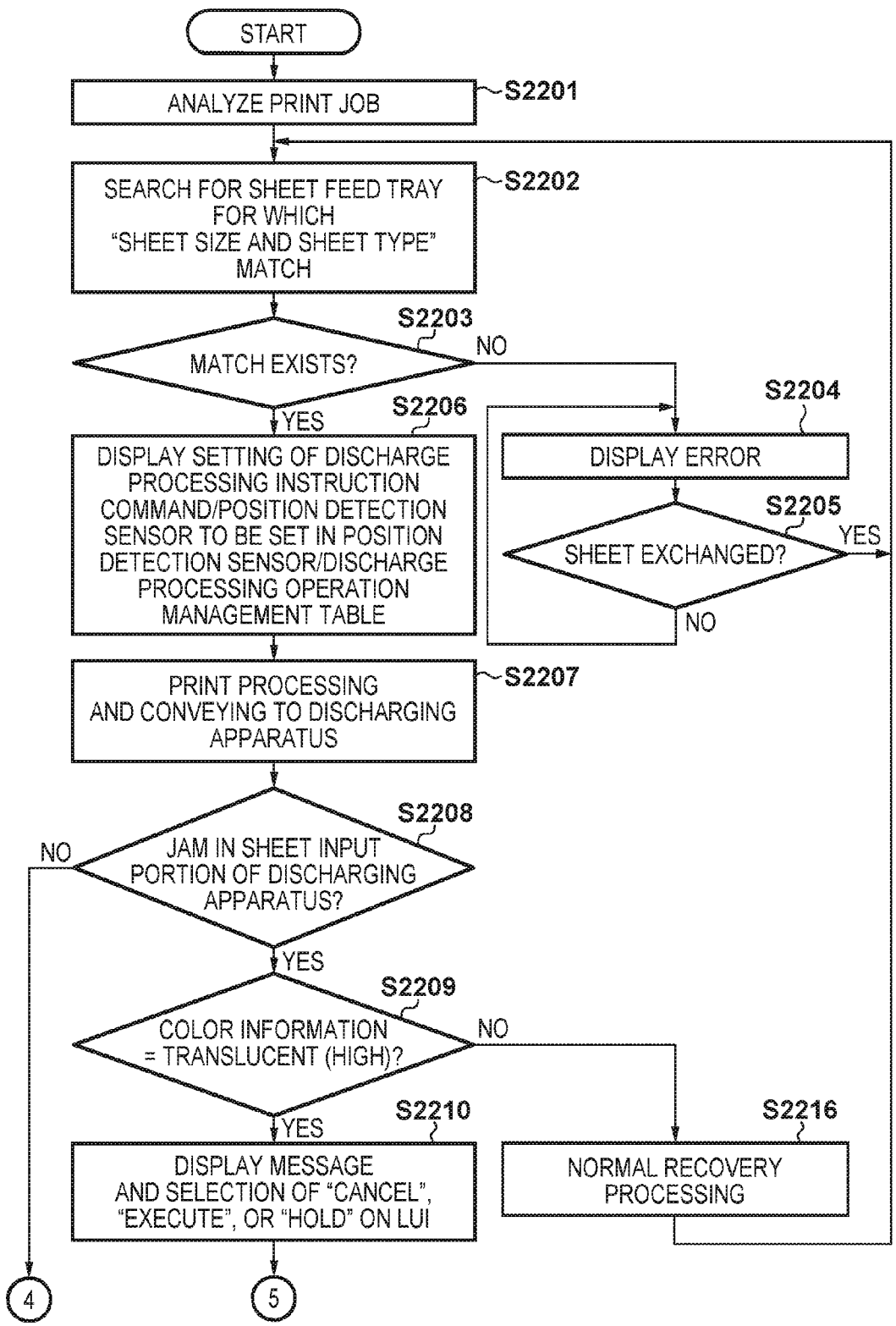
FIGS. 22A and 22B are flowcharts of control performed by an image forming apparatus 301.
Figure 22B:
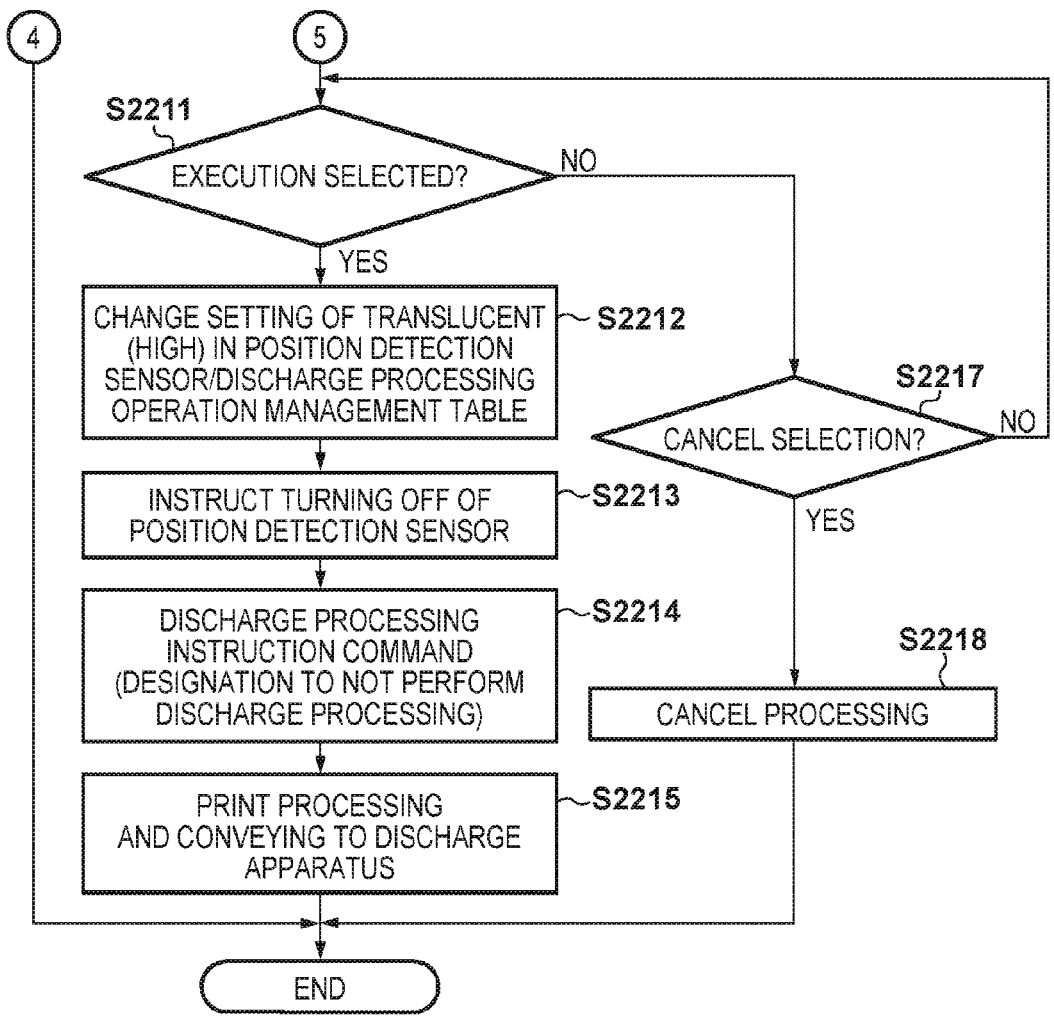

First, a procedure of processing performed by the printing apparatus 101 will be described with reference to FIGS. 22A and 22B. The processing described below is realized by the CPU 305 of the printing apparatus 101 reading out a control program stored in the ROM 310 or the HDD 311 to the RAM 306 and executing it.

In step S2201, the CPU 305 receives a print job, analyzes the job received by the job control unit 325, and obtains sheet information (sheet size, sheet type) to be used in the job and discharge processing designation information (e.g., a shift designation). Next, in step S2202, the CPU 305 searches for whether or not there is a sheet feed tray with a matching sheet size and sheet type among the obtained sheet information and the information managed in the sheet feed tray management table 700 stored in the sheet feed/discharging control information storage unit 329. In step S2203, the CPU 305 determines whether or not a matching sheet feed tray exists based on the search result of step S2202.

If there is no matching sheet feed tray, the processing moves to step S2204, and the CPU 305 displays an error (no sheet) on the operation unit 104 through the operation unit I/F 307 by means of the sheet feed control unit 327. Next, the processing moves to step S2205, and the CPU 305 determines whether or not sheet exchange has been performed by means of the sheet feed control unit 327. If sheet exchange has been performed, the processing returns to step S2202. If sheet exchange has not been performed, the processing returns to step S2204, and an error is displayed until sheet exchange is performed.

On the other hand, if there is a matching sheet feed tray, the processing moves to step S2206. In step S2206, by means of the discharge control unit 328, the CPU 305 determines an instruction command to the discharging apparatus 200 using the job control unit 325 in accordance with the settings of the management table (before changing) 2300 for the position detection sensors and sheet processing operations shown in FIG. 23. The discharging apparatus 200 is notified of the determined position detection sensor setting instruction and discharge processing instruction command via the device I/F 316. Next, the processing moves to step S2207, the printing apparatus 101 prints a print job using the sheet of the sheet feed tray selected in step S2203, and the printed sheets are conveyed to the discharging apparatus 200.

Next, in step S2208, by means of the discharge control unit 328, the CPU 305 determines whether or not an error (jam) has occurred at the sheet input portion of the discharging apparatus 200. If an error (jam) has occurred, the processing moves to step S2209, and if not, the processing ends. In step S2209, the CPU 305 determines whether or not the color information (transparency setting) of the sheet is translucent (high) based on the information in the sheet feed tray management table 700 of the sheet feed/discharging control information storage unit 329 and the sheet type management table 800 of the sheet type information storage unit 331.

If the color information (transparency setting) is not translucent (high), it is determined that an error such as a jam has actually occurred, the processing moves to step S2216, the CPU 305 performs print recovery processing by means of the job control unit 325, and the processing returns to step S2202. On the other hand, if the color information (transparency setting) is translucent (high), it is determined that an error in the transmission-type sensor has occurred, and the processing moves to step S2210. In step S2210, by means of the discharge control unit 328 and the job control unit 325, the CPU 305 displays a message and an operation button shown in FIG. 25 on the operation unit 104 via the operation unit I/F 307. Specifically, since post-processing cannot be executed on the sheet, notification is performed of the fact that the printing processing cannot be executed, and a button is displayed that allows the user to select whether to cancel or execute the job.

Next, in step S2211, the CPU 305 determines whether or not execution has been selected. If execution has been selected, the processing moves to step S2212, and if not, the processing moves to step S2217. In step S2212, by means of the discharge control unit 328, the CPU 305 changes (updates) the settings for the case of translucent (high) in the position detection sensor/discharge processing operation management table 2300, as shown in FIG. 24. Specifically, the settings for the case of translucent (high) are changed such that the position detection sensors are off and the discharge processing is disabled. Then, in step S2213, by means of the discharge control unit 328 and the job control unit 325, the CPU 305 performs notification of an instruction to temporarily turn off the position detection sensors in the discharging apparatus 200 via the device I/F 316 in accordance with the position detection sensor/discharge processing operation management table 2400.

Next, in step S2214, the CPU 305 uses the discharge control unit 328 and the job control unit 325 to perform notification of a discharge processing instruction command (a designation to not perform discharge processing) via the device I/F 316, in accordance with the position detection sensor/discharge processing operation management table 2400. Next, in step S2215, the printing apparatus 101 performs printing in accordance with the print job using the sheet of the sheet feed tray selected in step S2203, and causes the printed sheet to be conveyed to the discharging apparatus 200.

On the other hand, if execution has not been selected in step S2211, the CPU 305 determines whether or not the cancel button has been selected. If the cancel button has been selected, the processing moves to step S2218, and if not, the processing is returned to step S2211. In step S2218, the CPU 305 cancels the print job by means of the job control unit 325 and the processing ends.

The processing procedure of the controller 401 in the discharging apparatus 200 is similar to that of the second embodiment, and therefore description thereof will not be included here. In the above-described second embodiment, the on/off setting of the position detection sensors in the discharging apparatus 200 and the enabling/disabling of the discharge control processing is fixed according to the transparency information. However, in the present embodiment, the transparency information of the sheet type information is used to change the setting value of the management table managing the switching between the off and on settings of the position detection sensors in the discharging apparatus 200 and between enabling and disabling the discharge control processing. A change is performed in the case where an error occurs in which sheet position detection cannot be performed using the sensor in the discharging apparatus 200, and thereafter operation is performed in accordance with that setting. Accordingly, even if there are cases where sheet position detection is possible and where sheet position detection is not possible due to variation in the sensor detection sensitivity for the same sheets due to the usage environment (temperature, humidity, etc.) of the printing system, the user does not need to re-set the transparency information of the sheet type information, and thereby user-friendliness is improved.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-152698 filed on Jul. 31, 2015, which is hereby incorporated by reference herein in its entirety.

What is claimed is:

1. A printing apparatus, comprising:
a printer configured to print an image on a sheet;
a conveying roller for conveying the sheet supplied from the printer along a conveyance path;
an optical sensor provided on the conveyance path, the optical sensor detecting the sheet being conveyed by the conveying roller;
a finisher configured to perform finishing processing on the sheet conveyed by the conveying roller, based on detection information from the optical sensor;
an operation panel configured to be operable to receive sheet type information about a type of the sheet; and
a controller configured to control the finisher based on the sheet type information received by the operation panel such that:
(a) if the type of the sheet corresponds to a first type of translucent sheet, the finishing processing is performed on the sheet conveyed by the conveying roller, and
(b) if the type of the sheet corresponds to a second type of translucent sheet being different in transparency from the first type of translucent sheet, the sheet conveyed by the conveying roller is discharged without the finishing processing.

2. The printing apparatus according to claim 1, wherein the optical sensor is a light transmission type sensor.

3. The printing apparatus according to claim 1, wherein the finishing processing is stapling processing.

4. The printing apparatus according to claim 1, wherein the finishing processing is punching processing.

5. The printing apparatus according to claim 1, wherein the finishing processing is bookbinding processing.

6. The printing apparatus according to claim 1, wherein the finishing processing is alignment processing for aligning a plurality of printed sheets.

7. The printing apparatus according to claim 1, wherein the operation panel is configured to be operable to receive color information as the sheet type information.

8. The printing apparatus according to claim 1, further comprising a memory configured to store a transparency of a sheet and information indicating whether or not the finishing processing can be executed on a sheet with the transparency,
wherein the controller controls the finisher by referencing the information stored in the memory.

9. The printing apparatus according to claim 8, wherein when an error occurs during execution of the post-processing, the controller makes an inquiry to a user as to whether or not to cancel execution of a print job in which the sheet is used.

10. The printing apparatus according to claim 9, wherein if an instruction from the user is an instruction to cancel execution of the print job, the controller cancels the print job.

11. The printing apparatus according to claim 10, wherein if an instruction from the user is an instruction to continue execution of the print job, the controller updates the information in the memory.

12. A post-processing apparatus connected to a printing apparatus having a printer configured to print an image on a sheet, an operation panel configured to be operable to receive sheet type information about a type of the sheet, and a transmitter configured to transmit the received sheet type information input to the post-processing apparatus, the post-processing apparatus comprising:
a conveying roller for conveying the sheet supplied from the printer along a conveyance path;
an optical sensor provided on the conveyance path, the optical sensor detecting the sheet being conveyed by the conveying roller;
a finisher configured to perform finishing processing on the sheet conveyed by the conveying roller, based on detection information from the optical sensor;
a receiver for receiving the sheet type information transmitted from the printing apparatus; and
a controller configured to control the finisher based on the sheet information received by the operation panel such that:
(a) if the type of the sheet corresponds to a first type of translucent sheet, the finishing processing is performed on the sheet conveyed by the conveying roller, and
(b) if the type of the sheet corresponds to a second type of translucent sheet being different in transparency from the first type of translucent sheet, the sheet conveyed by the conveying roller is discharged without the finishing processing.

13. A printing apparatus comprising:
a printer configured to print an image on a sheet;
a conveying roller for conveying the sheet supplied from the printer along a conveyance path;
an optical sensor provided on the conveyance path, the optical sensor detecting the sheet being conveyed by the conveying roller;
a finisher configured to perform a finishing process on the sheet conveyed by the conveying roller, based on detection information from the optical sensor;
an operation panel configured to be operable to receive sheet type information about a transparency type of the sheet; and
a controller configured to control the finisher to perform the finishing process on the sheet conveyed by the conveying roller if the type of the sheet corresponds to a first type of translucent sheet,
wherein the controller is configured to control the operation panel to display a message indicating that the finishing processing cannot be performed if the type of the sheet corresponds to a second type of translucent sheet being different in transparency from the first type of translucent sheet.

14. The printing apparatus according to claim 13, wherein the transparency of the second type of translucent sheet is higher than the transparency of the first type of translucent sheet.

* * * * *